(12) United States Patent
Liang

(10) Patent No.: US 12,468,112 B2
(45) Date of Patent: Nov. 11, 2025

(54) LENS MODULE

(71) Applicant: NEWMAX TECHNOLOGY CO., LTD., Taichung (TW)

(72) Inventor: Yung-Fu Liang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 756 days.

(21) Appl. No.: 17/500,997

(22) Filed: Oct. 14, 2021

(65) Prior Publication Data

US 2023/0035911 A1    Feb. 2, 2023

(30) Foreign Application Priority Data

Jul. 27, 2021    (TW) ................................ 110127567

(51) Int. Cl.
     *G02B 7/02*      (2021.01)
     *G02B 13/18*      (2006.01)

(52) U.S. Cl.
     CPC ............. *G02B 7/021* (2013.01); *G02B 13/18* (2013.01)

(58) Field of Classification Search
     CPC ........ G02B 7/021; G02B 7/022; G02B 7/023; G02B 7/025; G02B 7/026
     See application file for complete search history.

(56) References Cited

U.S. PATENT DOCUMENTS

| | | | |
|---|---|---|---|
| 2008/0266680 A1* | 10/2008 | Chiang | G02B 7/021 359/819 |
| 2013/0271641 A1* | 10/2013 | Calvet | G02B 7/028 348/340 |
| 2019/0187402 A1* | 6/2019 | Masuzawa | G02B 7/022 |
| 2020/0012066 A1* | 1/2020 | Yin | H04N 23/57 |
| 2020/0200990 A1* | 6/2020 | Furutake | G02B 7/025 |
| 2020/0409108 A1* | 12/2020 | Ma | G02B 7/022 |
| 2021/0048600 A1* | 2/2021 | Gao | G02B 13/18 |
| 2021/0352196 A1* | 11/2021 | Chen | G02B 7/021 |
| 2022/0365254 A1* | 11/2022 | Tsai | G02B 7/028 |

* cited by examiner

*Primary Examiner* — Ephrem Z Mebrahtu
(74) *Attorney, Agent, or Firm* — Juan Carlos A. Marquez; Marquez IP Law Office, PLLC

(57) ABSTRACT

A lens module includes a lens barrel and a first optical lens. The lens barrel includes a first lens chamber and a second lens chamber arranged along an optical axis, wherein an inner edge surface of the lens barrel has an extension portion, the extension portion is located between the first lens chamber and the second lens chamber and defines a light-passing hole, and the first lens chamber communicates with the second lens chamber via the light-passing hole. The first optical lens is disposed in the first lens chamber and has a first optical zone surrounding the optical axis and a first non-optical zone surrounding an outside of the first optical zone, wherein the first non-optical zone includes a first protrusion, and the first protrusion is disposed in the light-passing hole.

16 Claims, 6 Drawing Sheets

LENS MODULE

CROSS-REFERENCE TO RELATED APPLICATION

This application claims the benefit of Taiwan Patent Application No. 110127567, filed on Jul. 27, 2021, which is hereby incorporated by reference for all purposes as if fully set forth herein.

BACKGROUND

Technical Field

The present disclosure relates to a lens module, and in particular, to a lens module utilizes a first protrusion of a first optical lens to dispose in a light-passing hole.

Related Art

With the flourishing consumer electronics, a lens module has been widely applied to a mobile phone, a laptop, a tablet computer, a television, an automobile, a security system, and the like. Strengths and weaknesses of the lens module directly influence imaging quality, and an assembly process of a lens module is often particularly critical. A conventional lens module includes a plurality of optical lenses, and the optical lenses are assembled in a lens barrel in order. Many lens assembling processes may generate many assembly tolerances. If assembly errors are reduced, the imaging quality can be greatly improved.

A first optical lens to an $N^{th}$ optical lens are accommodated in the lens barrel of the conventional lens module in order, the first optical lens is closely fitted with an internal side wall of the lens barrel to fix the first optical lens, and thus the first optical lens and the lens barrel may be easily deformed after assembling. Especially, a larger ratio of an outer diameter of the first optical lens to a thickness of an optical effective region of the first optical lens indicates a greater influence on deformation of the optical effective region of the first optical lens. A ratio of an outer diameter of the first optical lens of an ultra-wide-angle lens module or a wide-angle lens module to the thickness of the optical effective region of the first optical lens is generally large, causing deformation of the optical effective region, and therefore it is necessary to change a structure of the lens module.

Therefore, it is necessary to provide a lens module capable of resolving the foregoing problems.

SUMMARY

An objective of the present disclosure is to provide a lens module utilizing a first protrusion of a first optical lens to dispose in a light-passing hole.

To achieve the above objective, the present disclosure provides a lens module, including: a lens barrel including a first lens chamber and a second lens chamber arranged along an optical axis, wherein an inner edge surface of the lens barrel has an extension portion, the extension portion is located between the first lens chamber and the second lens chamber and defines a light-passing hole, and the first lens chamber communicates with the second lens chamber via the light-passing hole; and a first optical lens disposed in the first lens chamber and having a first optical zone surrounding the optical axis and a first non-optical zone surrounding an outside of the first optical zone, wherein the first non-optical zone comprises a first protrusion, and the first protrusion is disposed in the light-passing hole.

According to the lens module of the present disclosure, the lens module utilizes the first protrusion of the first optical lens to dispose in the light-passing hole, the outer edge surface of the first optical lens will not be in contact with the inner edge surface of the lens barrel, so as to resolve the problem of deformation of the first optical lens of the wide-angle lens module or the ultra-wide-angle lens module in an optical effective region.

BRIEF DESCRIPTION OF THE DRAWINGS

FIG. 4 is a schematic cross-sectional assembly view of an enlarged part A of the lens module shown in FIG. 2a.

FIG. 5 is a schematic cross-sectional assembly view of an enlarged part B of the lens module shown in FIG. 2a.

FIG. 7 is a schematic cross-sectional assembly view of an enlarged part A' of the lens module shown in FIG. 6a.

FIG. 8 is a schematic cross-sectional assembly view of an enlarged part B' of the lens module shown in FIG. 6a.

DETAILED DESCRIPTION

To make the foregoing objective, features, and characteristics of the present disclosure clearer and more comprehensive, detailed descriptions are provided below with reference to the accompanying drawings.

Figure 1:
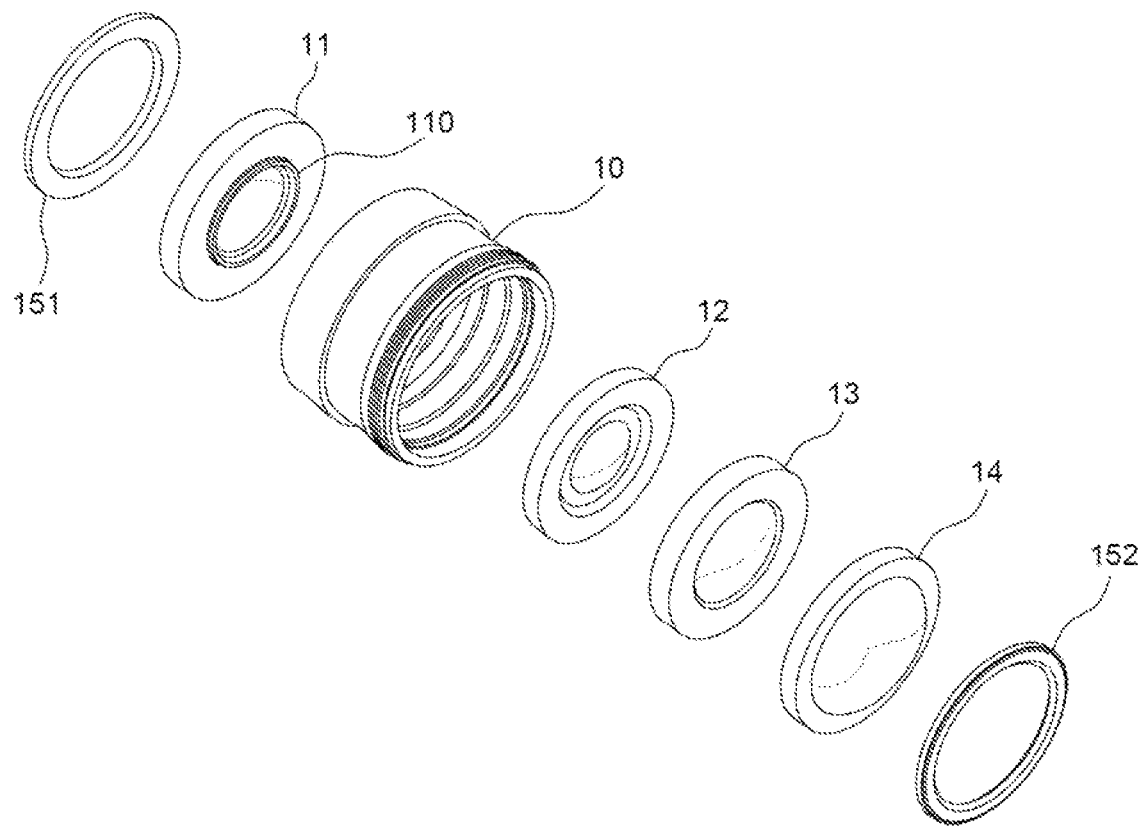
FIG. 1 is a schematic three-dimensional exploded view of a lens module according to a first embodiment of the present disclosure.
Figure 2A:
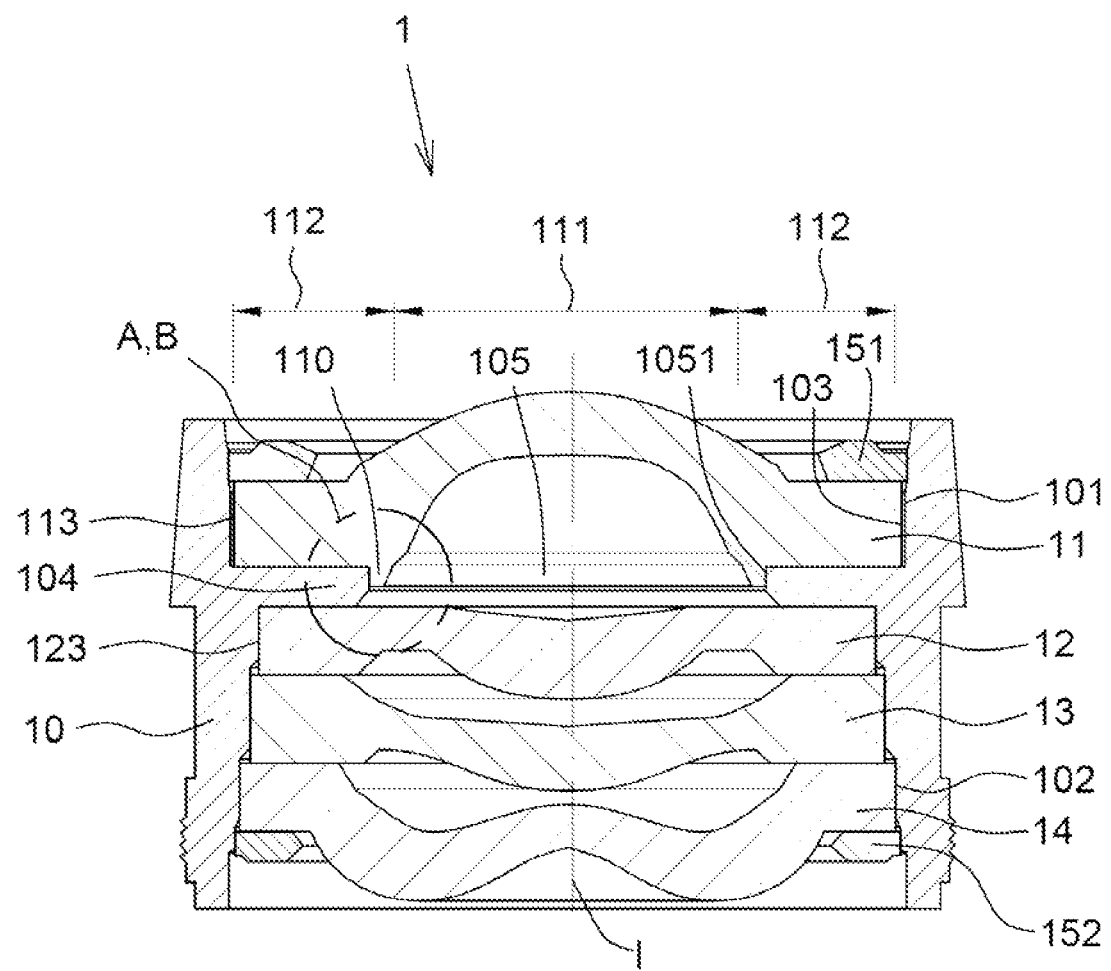
FIG. 2a is a cross-sectional assembly view of the lens module according to a first embodiment of the present disclosure.
Figure 2B:
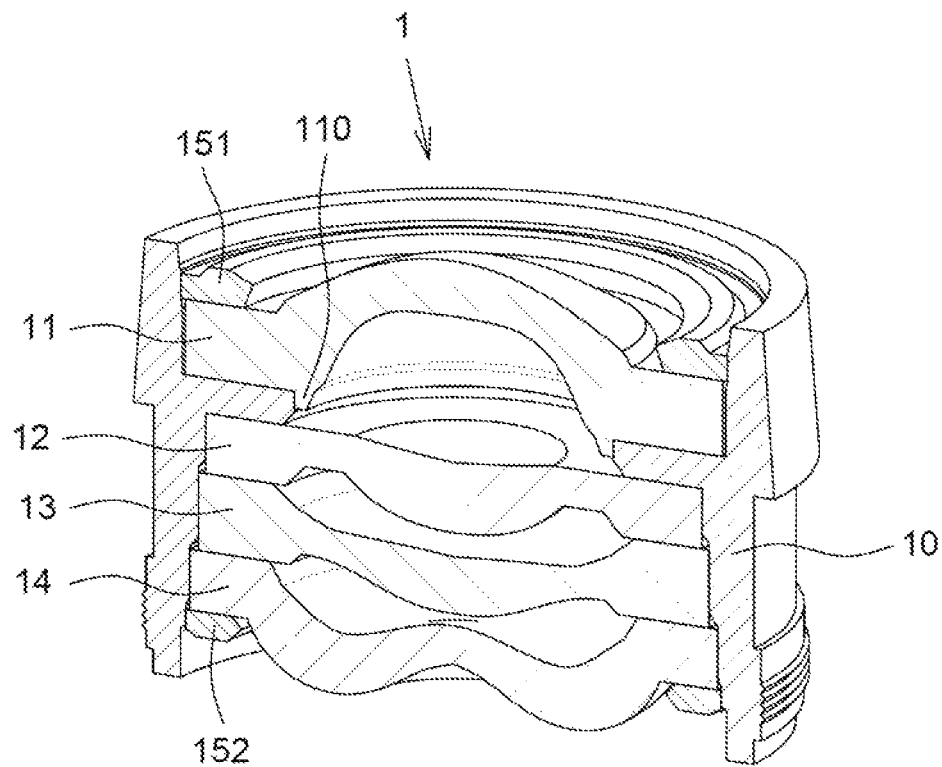
FIG. 2b is a three-dimensional assembly view of the lens module according to a first embodiment of the present disclosure.
Figure 3:
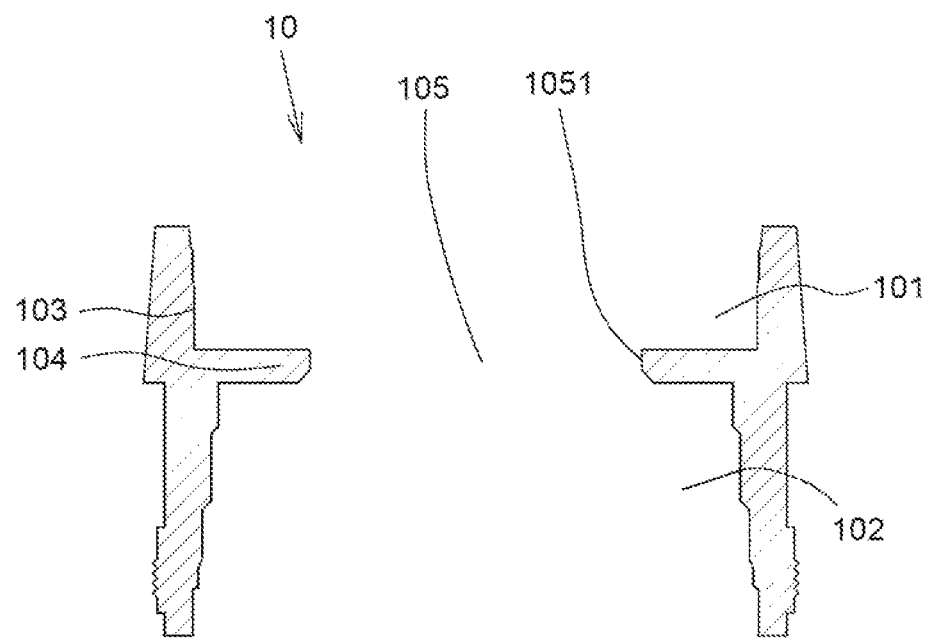
FIG. 3 is a schematic cross-sectional view of a lens barrel of the lens module according to the present disclosure.

FIG. 1 is a schematic three-dimensional exploded view of a lens module according to a first embodiment of the present disclosure. FIG. 2a is a cross-sectional assembly view of the lens module according to a first embodiment of the present disclosure. FIG. 2b is a three-dimensional assembly view of the lens module according to a first embodiment of the present disclosure. FIG. 3 is a schematic cross-sectional view of a lens barrel of the lens module according to the present disclosure. Referring to FIG. 1, FIG. 2a, FIG. 2b, and FIG. 3, the lens module 1 includes: a lens barrel 10 and a first optical lens 11 to an $N^{th}$ optical lens (for example, the first optical lens 11, a second optical lens 12, a third optical lens 13, and a fourth optical lens 14). The first optical lens 11 to the $N^{th}$ optical lens may be made of a plastic material or a glass material. The lens barrel 10 is an integrated lens barrel, and the lens barrel 10 may be made of the plastic material. The first optical lens 11 to the $N^{th}$ optical lens are accommodated in two lens chambers in the lens barrel 10, for example, the first optical lens to the $N^{th}$ optical lens are divided into a first optical lens set and a second optical lens set respectively accommodated in the two lens chambers of the lens barrel. The first optical lens set may include a single optical lens, a plurality of optical lenses, or other optical elements, and the second optical lens set may include a single optical lens, a plurality of optical lenses, or other optical elements. The optical element may include a spacer ring, an optical filter (for example, an infrared optical filter, an infrared bandpass filter, or other optical band filters), a light-shielding element (for example, an aperture diaphragm or a diaphragm configured to correct marginal light), or the like.

In the first embodiment, the lens barrel 10 includes a first lens chamber 101 and a second lens chamber 102 arranged along an optical axis I. An inner edge surface 103 of the lens barrel 10 has an extension portion 104, and the extension portion 104 is located between the first lens chamber 101 and the second lens chamber 102. The extension portion 104 is annular and defines a light-passing hole 105, and the first lens chamber 101 communicates with the second lens chamber 102 via the light-passing hole 105. An inner diameter of an inner surface 1051 of the light-passing hole 105 is a minimum inner diameter of the inner edge surface 103 of the lens barrel 10.

Figure 4:
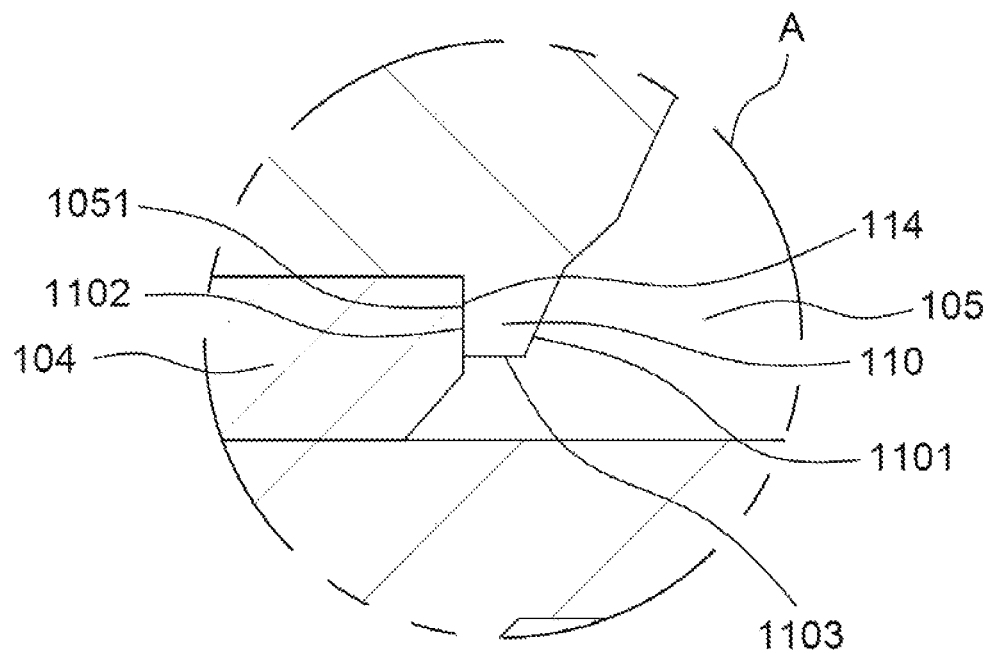

Referring to FIG. 2a again, the first optical lens 11 is disposed in the first lens chamber 101 and has a first optical zone 111 surrounding the optical axis I and a first non-optical zone 112 surrounding an outside of the first optical zone 111. The first non-optical zone 112 includes a first protrusion 110, and the first protrusion 110 is annular and disposed in the light-passing hole 105, for example, the first protrusion 110 is physically connected to the inner surface 1051 of the light-passing hole 105 to fix the first optical lens 11. Referring to FIG. 4, the first protrusion 110 includes an inside surface 1101, an outside surface 1102, and a top surface 1103. The top surface 1103 is connected to the inside surface 1101 and the outside surface 1102, and the outside surface 1102 of the first protrusion 110 is in contact with the extension portion 104 of the lens barrel 10 (for example, in partial contact with each other, but the present disclosure is not limited thereto). The first optical lens 11 is an optical lens of a wide-angle lens module or an ultra-wide-angle lens module closest to an object side. A viewing angle of the wide-angle lens module is between 100 degrees and 120 degrees, and a viewing angle of the ultra-wide-angle lens module is usually greater than 120 degrees.

The lens module 1 further includes: the second optical lens 12, disposed in the second lens chamber 102 and having a second optical zone (similar to the first optical zone 111) surrounding the optical axis I and a second non-optical zone (similar to the first non-optical zone 112) surrounding an outside of the second optical zone. The extension portion 104 is axially disposed between the first non-optical zone 112 of the first optical lens 11 and the second non-optical zone of the second optical lens 12, and an outer diameter of the first optical lens 11 is greater than an outer diameter of the second optical lens 12. The second optical lens 12 has an outer edge surface 123 in contact with the inner edge surface 103 of the lens barrel 10.

The lens module 1 further includes: the third optical lens 13, disposed in the second lens chamber 102 and having a third optical zone (similar to the first optical zone 111) surrounding the optical axis I and a third non-optical zone (similar to the first non-optical zone 112) surrounding an outside of the third optical zone. The second non-optical zone of the second optical lens 12 is axially disposed between the extension portion 104 and the third non-optical zone of the third optical lens 13. In this embodiment, an outer diameter of the third optical lens 13 is greater than the outer diameter of the second optical lens 12. In other embodiments, the outer diameter of the third optical lens 13 may be less than (or equal to) the outer diameter of the second optical lens 12.

The lens module 1 further includes: the fourth optical lens 14, disposed in the second lens chamber 102 and having a fourth optical zone (similar to the first optical zone 111) surrounding the optical axis I and a fourth non-optical zone (similar to the first non-optical zone 112) surrounding an outside of the fourth optical zone. The third non-optical zone of the third optical lens 13 is axially disposed between the second non-optical zone of the second optical lens 12 and the fourth non-optical zone of the fourth optical lens 14. In this embodiment, an outer diameter of the fourth optical lens 14 is greater than the outer diameter of the third optical lens 13. In other embodiments, the outer diameter of the fourth optical lens 14 may be less than (or equal to) the outer diameter of the third optical lens 13.

The lens module 1 further includes: two pressing rings 151 and 152. After the first optical lens 11 is disposed, the pressing ring 151 is disposed in the first lens chamber 101. After the fourth optical lens 14 is disposed, the pressing ring 152 is disposed in the second lens chamber 102.

Figure 5:
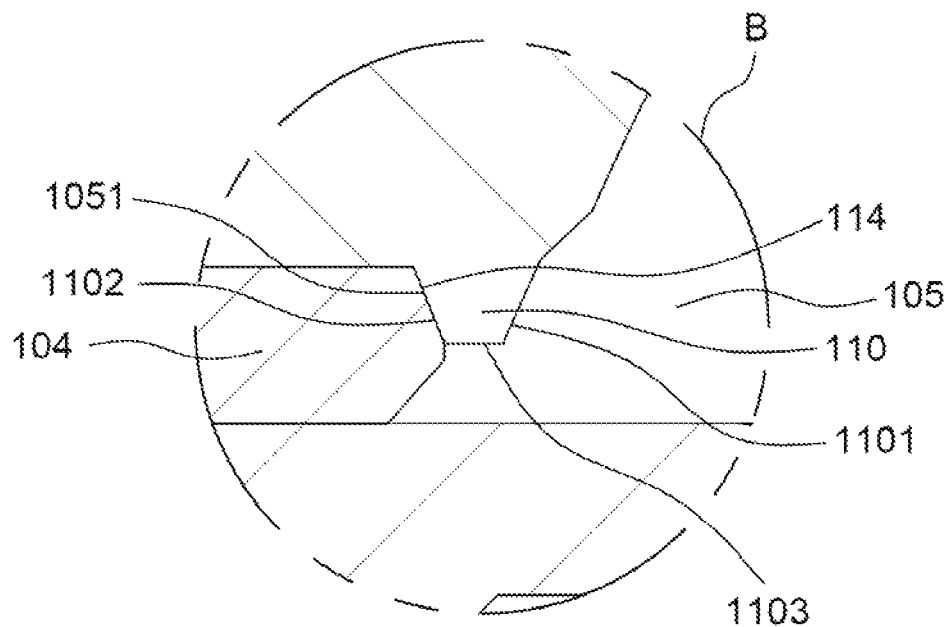

Referring to FIG. 2a and FIG. 4, in this embodiment, the first protrusion 110 is embedded into the inner surface 1051 of the light-passing hole 105 and is in contact with the inner surface 1051 of the light-passing hole 105 (for example, in partial contact with each other, but the present disclosure is not limited thereto), and a contact surface 114 between the first protrusion 110 and the inner surface 1051 of the light-passing hole 105 is parallel to the optical axis I. When the first optical lens 11 is disposed in the first lens chamber 101 along the optical axis I, the contact surface 114 between the first protrusion 110 and the inner surface 1051 of the light-passing hole 105 is parallel to the optical axis I, and thus the first protrusion 110 has a better assembly and close-fitting effect on the light-passing hole 105. Referring to FIG. 2a and FIG. 5, in another embodiment, the first protrusion 110 is embedded into the inner surface 1051 of the light-passing hole 105 and is in contact with the inner surface 1051 of the light-passing hole 105, and the contact surface 114 between the first protrusion 110 and the inner surface 1051 of the light-passing hole 105 is inclined to the optical axis I. When the first optical lens 11 is disposed in the first lens chamber 101 along the optical axis I, the contact surface 114 between the first protrusion 110 and the inner surface 1051 of the light-passing hole 105 is inclined to the optical axis I (that is, an inner diameter of the light-passing hole 105 changes from large to small along the optical axis I), and thus the first protrusion 110 has a better assembly and positioning effect on the light-passing hole 105.

Since the first protrusion 110 of the first optical lens 11 is disposed in the light-passing hole 105 to fix the first optical lens 11, an outer edge surface 113 of the first optical lens 11 will not be in contact with the inner edge surface 103 of the lens barrel 10, and then the first optical lens 11 can be fixed in the first lens chamber 101 by means of the pressing ring 151.

Figure 6A:
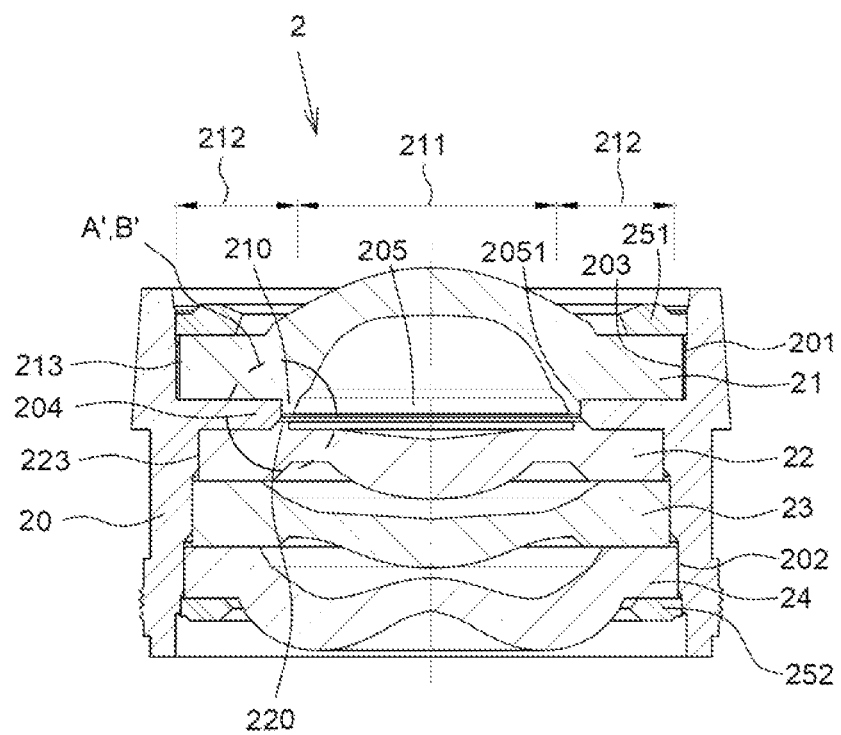
FIG. 6a is a cross-sectional assembly view of a lens module according to a second embodiment of the present disclosure.
Figure 6B:
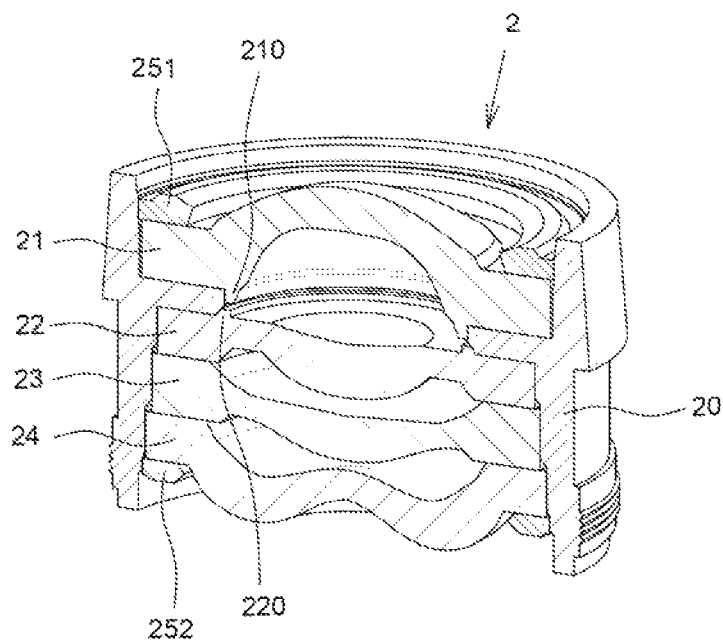
FIG. 6b is a three-dimensional assembly view of the lens module according to a second embodiment of the present disclosure.

FIG. 6a is a cross-sectional assembly view of a lens module according to a second embodiment of the present disclosure. FIG. 6b is a three-dimensional assembly view of the lens module according to a second embodiment of the present disclosure. The lens module 2 includes: a lens barrel 20 and a first optical lens 21 to an $N^{th}$ optical lens (for example, the first optical lens 21, a second optical lens 22, a third optical lens 23, and a fourth optical lens 24). The first optical lens 21 to the $N^{th}$ optical lens may be made of a plastic material or a glass material. The lens barrel 20 is an integrated lens barrel, and the lens barrel 20 may be made of the plastic material. The first optical lens 21 to the $N^{th}$ optical lens are accommodated in two lens chambers in the lens barrel 20, for example, the first optical lens to the $N^{th}$ optical lens are divided into a first optical lens set and a second optical lens set respectively accommodated in the two lens chambers of the lens barrel. The first optical lens set may include a single optical lens, a plurality of optical lenses, or other optical elements, and the second optical lens set may include a single optical lens, a plurality of optical lenses, or other optical elements. The optical element may include a spacer ring, an optical filter (for example, an infrared optical filter, an infrared bandpass filter, or other optical band filters), a light-shielding element (for example, an aperture diaphragm or a diaphragm configured to correct marginal light), or the like.

Figure 7:
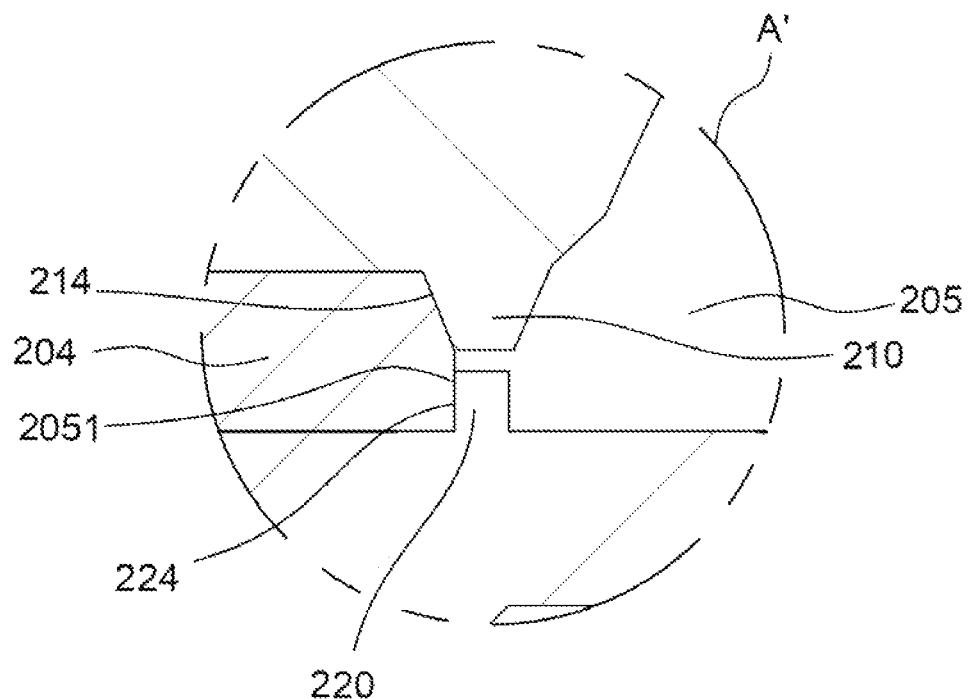

Referring to FIG. 6a, FIG. 6b, and FIG. 7, in a second embodiment, the lens barrel 20 includes a first lens chamber 201 and a second lens chamber 202 arranged along an optical axis I. An inner edge surface 203 of the lens barrel has an extension portion 204, and the extension portion 204 is located between the first lens chamber 201 and the second lens chamber 202. The extension portion 204 is annular and defines a light-passing hole 205, and the first lens chamber 201 communicates with the second lens chamber 202 via the light-passing hole 205. An inner diameter of an inner surface 2051 of the light-passing hole 205 is a minimum inner diameter of the inner edge surface 203 of the lens barrel 20.

Referring to FIG. 6a, the first optical lens 21 is disposed in the first lens chamber 201 and has a first optical zone 211 surrounding the optical axis I and a first non-optical zone 212 surrounding an outside of the first optical zone 211. The first non-optical zone 212 includes a first protrusion 210, and the first protrusion 210 is annular and disposed in the light-passing hole 205, for example, the first protrusion 210 is physically connected to the inner surface 2051 of the light-passing hole 205 to fix the first optical lens 21. The first optical lens 21 is an optical lens of a wide-angle lens module or an ultra-wide-angle lens module closest to an object side. A viewing angle of the wide-angle lens module is between 100 degrees and 120 degrees, and a viewing angle of the ultra-wide-angle lens module is usually greater than 120 degrees.

The lens module 2 further includes: the second optical lens 22, disposed in the second lens chamber 202 and having a second optical zone (similar to the first optical zone 211) surrounding the optical axis I and a second non-optical zone (similar to the first non-optical zone 212) surrounding an outside of the second optical zone. The extension portion 204 is axially disposed between the first non-optical zone 212 of the first optical lens 21 and the second non-optical zone of the second optical lens 22, and an outer diameter of the first optical lens 21 is greater than an outer diameter of the second optical lens 22. The second non-optical zone of the second optical lens 22 includes a second protrusion 220, and the second protrusion 220 is annular and disposed in the light-passing hole 205, for example, the second protrusion 220 is physically connected to the inner surface 2051 of the light-passing hole 205 to fix the second optical lens 22.

The lens module 2 further includes: the third optical lens 23, disposed in the second lens chamber 202 and having a third optical zone (similar to the first optical zone 211) surrounding the optical axis I and a third non-optical zone (similar to the first non-optical zone 212) surrounding an outside of the third optical zone. The second non-optical zone of the second optical lens 22 is axially disposed between the extension portion 204 and the third non-optical zone of the third optical lens 23. In the second embodiment, an outer diameter of the third optical lens 23 is greater than the outer diameter of the second optical lens 22. In other embodiments, the outer diameter of the third optical lens 23 may be less than (or equal to) the outer diameter of the second optical lens 22.

The lens module 2 further includes: the fourth optical lens 24, disposed in the second lens chamber 202 and having a fourth optical zone (similar to the first optical zone 211) surrounding the optical axis I and a fourth non-optical zone (similar to the first non-optical zone 212) surrounding an outside of the fourth optical zone. The third non-optical zone of the third optical lens 23 is axially disposed between the second non-optical zone of the second optical lens 22 and the fourth non-optical zone of the fourth optical lens 24. In this embodiment, an outer diameter of the fourth optical lens 24 is greater than the outer diameter of the third optical lens 23. In other embodiments, the outer diameter of the fourth optical lens 24 may be less than (or equal to) the outer diameter of the third optical lens 23.

The lens module 2 further includes: two pressing rings 251 and 252. After the first optical lens 21 is disposed, the pressing ring 251 is disposed in the first lens chamber 201. After the fourth optical lens 24 is disposed, the pressing ring 252 is disposed in the second lens chamber 202.

Figure 8:
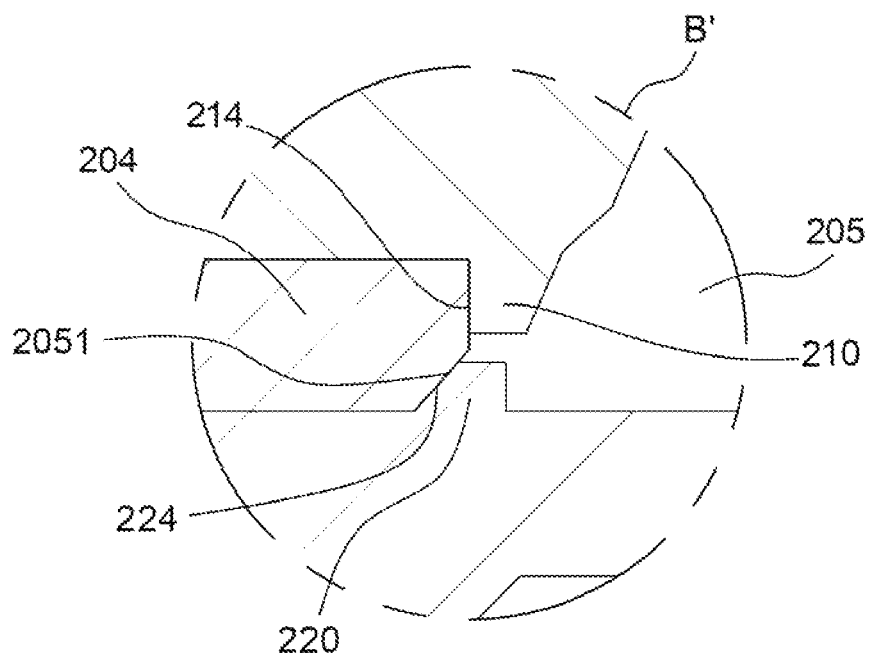

Referring to FIG. 6a and FIG. 7, in this embodiment, the first protrusion 210 is embedded into the inner surface 2051 of the light-passing hole 205 and is in contact with the inner surface 2051 of the light-passing hole 205, and a contact surface 214 between the first protrusion 210 and the inner surface 2051 of the light-passing hole 205 is inclined to the optical axis I. When the first optical lens 21 is disposed in the first lens chamber 201 along the optical axis I, the contact surface 214 between the first protrusion 210 and the inner surface 2051 of the light-passing hole 205 is inclined to the optical axis I (that is, an inner diameter of the light-passing hole 205 changes from large to small along the optical axis I), and thus the first protrusion 210 has a better assembly and positioning effect on the light-passing hole 205. Referring to FIG. 6a and FIG. 8, in another embodiment, the first protrusion 210 is embedded into the inner surface 2051 of the light-passing hole 205 and is in contact with the inner surface 2051 of the light-passing hole 205, and the contact surface 214 between the first protrusion 210 and the inner surface 2051 of the light-passing hole 205 is parallel to the optical axis I. When the first optical lens 21 is disposed in the first lens chamber 201 along the optical axis I, the contact surface 214 between the first protrusion 210 and the inner surface 2051 of the light-passing hole 205 is parallel to the optical axis I, and thus the first protrusion 210 has a better assembly and close-fitting effect on the light-passing hole 205.

Since the first protrusion 210 of the first optical lens 21 is disposed in the light-passing hole 205 to fix the first optical lens 21, an outer edge surface 213 of the first optical lens 21 will not be in contact with the inner edge surface 203 of the lens barrel 20, and then the first optical lens 21 can be fixed in the first lens chamber 201 by means of the pressing ring 251.

Referring to FIG. 6a and FIG. 7 again, in this embodiment, the second protrusion 220 is embedded into the inner surface 2051 of the light-passing hole 205 and is in contact with the inner surface 2051 of the light-passing hole 205 (for example, in partial contact with each other, but the present disclosure is not limited thereto), and a contact surface 224 between the second protrusion 220 and the inner surface 2051 of the light-passing hole 205 is parallel to the optical axis I. When the second optical lens 22 is disposed in the second lens chamber 202 along the optical axis I in an opposite direction, the contact surface 224 between the second protrusion 220 and the inner surface 2051 of the light-passing hole 205 is parallel to the optical axis I, and thus the second protrusion 220 has a better assembly and close-fitting effect on the light-passing hole 205. Referring to FIG. 6a and FIG. 8 again, in another embodiment, the second protrusion 220 is embedded into the inner surface 2051 of the light-passing hole 205 and is in contact with the inner surface 2051 of the light-passing hole 205, and the contact surface 224 between the second protrusion 220 and the inner surface 2051 of the light-passing hole 205 is inclined to the optical axis I. When the second optical lens 22 is disposed in the second lens chamber 202 along the optical axis I in an opposite direction, the contact surface 224 between the second protrusion 220 and the inner surface 2051 of the light-passing hole 205 is inclined to the optical axis I (that is, the inner diameter of the light-passing hole 205 changes from large to small along the optical axis I in an opposite direction), and thus the second protrusion 220 has a better assembly and positioning effect on the light-passing hole 205.

Since the second protrusion 220 of the second optical lens 22 is disposed in the light-passing hole 205 to fix the second optical lens 22, and then the second optical lens 22, the third optical lens 23 and the fourth optical lens 24 can be fixed in the second lens chamber 202 by means of the pressing ring 252, an outer edge surface 223 of the second optical lens 22 will not be in contact with the inner edge surface 203 of the lens barrel 20. In an optical lens set, the second optical lens 22 is easily deformed during assembling due to high optical sensitivity, and thus the design that the second optical lens 22 is not in contact with the inner edge surface 203 of the lens barrel 20 can alleviate the deformation problem caused by the second optical lens 22 being assembled in the lens barrel 20.

According to the lens module of the present disclosure, the lens module utilizes a first protrusion of the first optical lens to dispose in the light-passing hole, the outer edge surface of the first optical lens will not be in contact with the inner edge surface of the lens barrel, so as to resolve the problem of deformation of the first optical lens of the wide-angle lens module or the ultra-wide-angle lens module in an optical effective region. Moreover, according to the lens module of the present disclosure, the lens module utilizes the second protrusion of the second optical lens to dispose in the light-passing hole, the outer edge surface of the second optical lens will not be in contact with the inner edge surface of the lens barrel, so as to alleviate the problem of deformation of the second optical lens being assembled in the lens barrel.

In conclusion, preferred implementations or embodiments of the technical means adopted by the present disclosure to resolve the problems of the present disclosure are merely recorded, and are not intended to limit the scope of implementation of the present disclosure. That is, any equivalent changes and modifications literally conforming to the scope of the claims of the present disclosure or made according to the scope of the claims of the present disclosure shall fall within the scope of the present disclosure.

What is claimed is:

1. A lens module, comprising:
    a lens barrel comprising a first lens chamber and a second lens chamber arranged along an optical axis, wherein an inner edge surface of the lens barrel has an extension portion, the extension portion is located between the first lens chamber and the second lens chamber and defines a light-passing hole, and the first lens chamber communicates with the second lens chamber via the light-passing hole; and
    a first optical lens disposed in the first lens chamber and having a first optical zone surrounding the optical axis and a first non-optical zone surrounding an outside of the first optical zone, wherein the first non-optical zone comprises a first protrusion, the first protrusion is disposed in the light-passing hole, and the first protrusion is in contact with the extension portion of the lens barrel;
    wherein the first protrusion is physically connected to the inner surface of the light-passing hole to fix the first optical lens, and the position of the first protrusion physically connected to the light-passing hole is located between the first lens chamber and the second lens chamber defined by the extension portion of the lens barrel.

2. The lens module according to claim 1, wherein the first protrusion comprises an inside surface, an outside surface, and a top surface connected to the inside surface and the outside surface, and the outside surface of the first protrusion is in contact with the extension portion of the lens barrel.

3. The lens module according to claim 1, further comprising a second optical lens, disposed in the second lens chamber and having a second optical zone surrounding the optical axis and a second non-optical zone surrounding an outside of the second optical zone, wherein the extension portion is axially disposed between the first non-optical zone of the first optical lens and the second non-optical zone of the second optical lens, and an outer diameter of the first optical lens is greater than an outer diameter of the second optical lens.

4. The lens module according to claim 1, wherein the first optical lens has an outer edge surface not in contact with the inner edge surface of the lens barrel.

5. The lens module according to claim 3, wherein the second optical lens has an outer edge surface in contact with the inner edge surface of the lens barrel.

6. The lens module according to claim 3, wherein the second optical lens has an outer edge surface not in contact with the inner edge surface of the lens barrel, the second non-optical zone comprises a second protrusion, and the second protrusion is disposed in the light-passing hole.

7. The lens module according to claim 1, wherein an inner diameter of an inner surface of the light-passing hole is a minimum inner diameter of the inner edge surface of the lens barrel.

8. The lens module according to claim 1, wherein the first protrusion is in contact with an inner surface of the light-passing hole, and a contact surface between the first protrusion and the inner surface of the light-passing hole is parallel to the optical axis.

9. The lens module according to claim 1, wherein the first protrusion is in contact with an inner surface of the light-passing hole, and a contact surface between the first protrusion and the inner surface of the light-passing hole is inclined to the optical axis.

10. The lens module according to claim 6, wherein the second protrusion is in contact with an inner surface of the light-passing hole, and a contact surface between the second protrusion and the inner surface of the light-passing hole is parallel to the optical axis.

11. The lens module according to claim 6, wherein the second protrusion is in contact with an inner surface of the light-passing hole, and a contact surface between the second protrusion and the inner surface of the light-passing hole is inclined to the optical axis.

12. The lens module according to claim 6, wherein the first protrusion and the second protrusion are both annular.

13. The lens module according to claim 3, further comprising a third optical lens, disposed in the second lens chamber and having a third optical zone surrounding the optical axis and a third non-optical zone surrounding an outside of the third optical zone, wherein the second non-optical zone of the second optical lens is axially disposed between the extension portion and the third non-optical zone of the third optical lens.

14. The lens module according to claim 13, further comprising a fourth optical lens, disposed in the second lens chamber and having a fourth optical zone surrounding the optical axis and a fourth non-optical zone surrounding an outside of the fourth optical zone, wherein the third non-optical zone of the third optical lens is axially disposed between the second non-optical zone of the second optical lens and the fourth non-optical zone of the fourth optical lens.

15. The lens module according to claim 14, further comprising first and second pressing rings, wherein the first pressing ring is disposed in the first lens chamber; and the second pressing ring is disposed in the second lens chamber.

16. The lens module according to claim 1, wherein the first optical lens is an optical lens of a wide-angle lens module or an ultra-wide-angle lens module closest to an object side, a viewing angle of the wide-angle lens module is between 100 degrees and 120 degrees, and a viewing angle of the ultra-wide-angle lens module is greater than 120 degrees.

* * * * *